May 15, 1973   T. H. JENSEN   3,733,188
METHOD AND APPARATUS FOR FORMING GLASS FIBERS
Filed May 4, 1971   10 Sheets-Sheet 1

INVENTOR
THOMAS H. JENSEN
ATTORNEYS

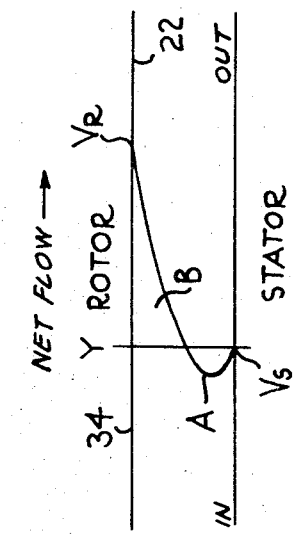
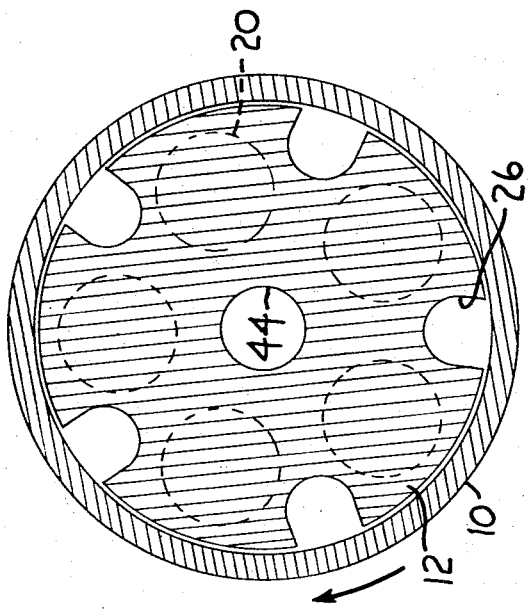
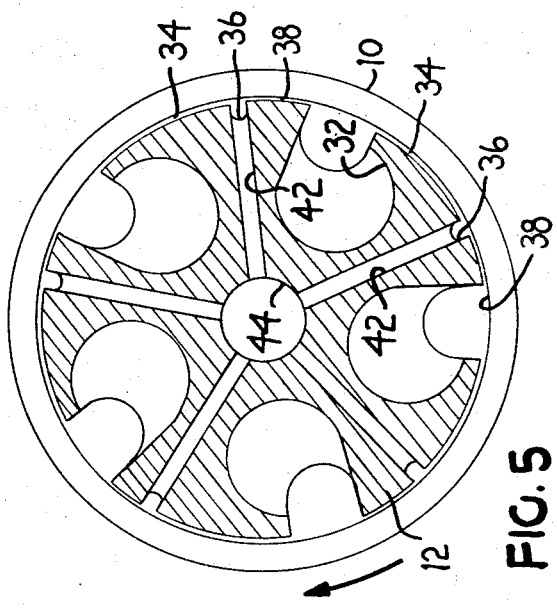
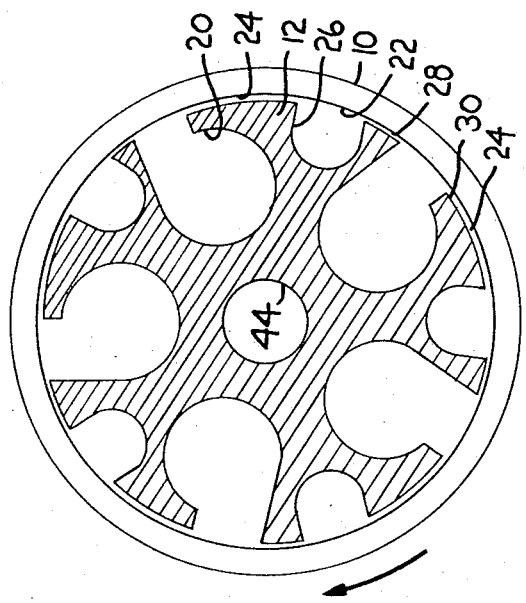

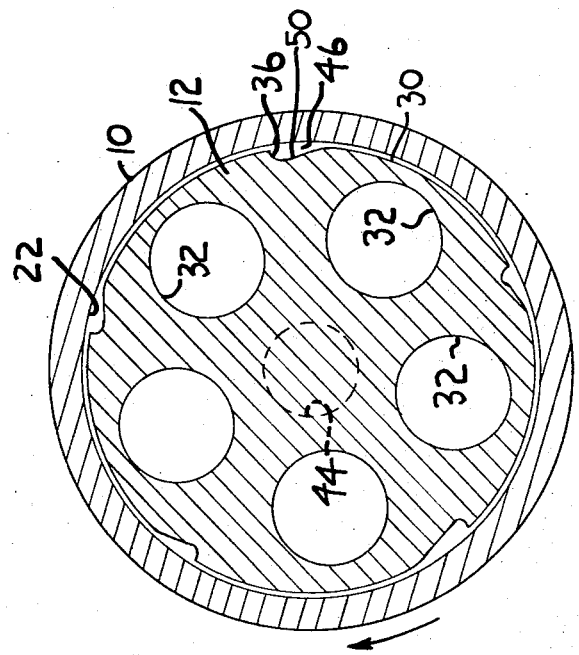
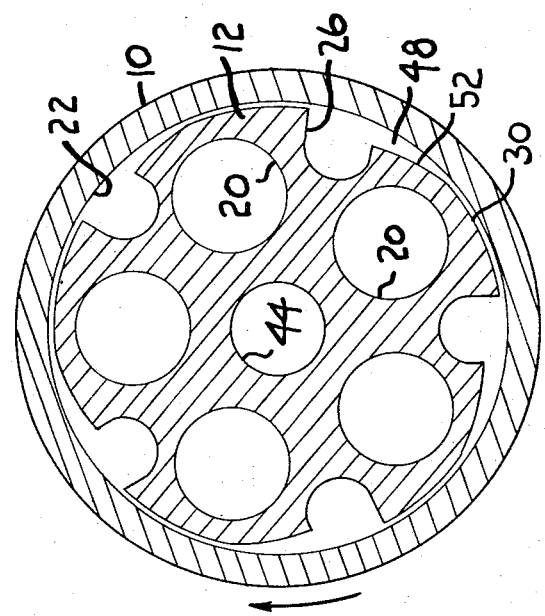

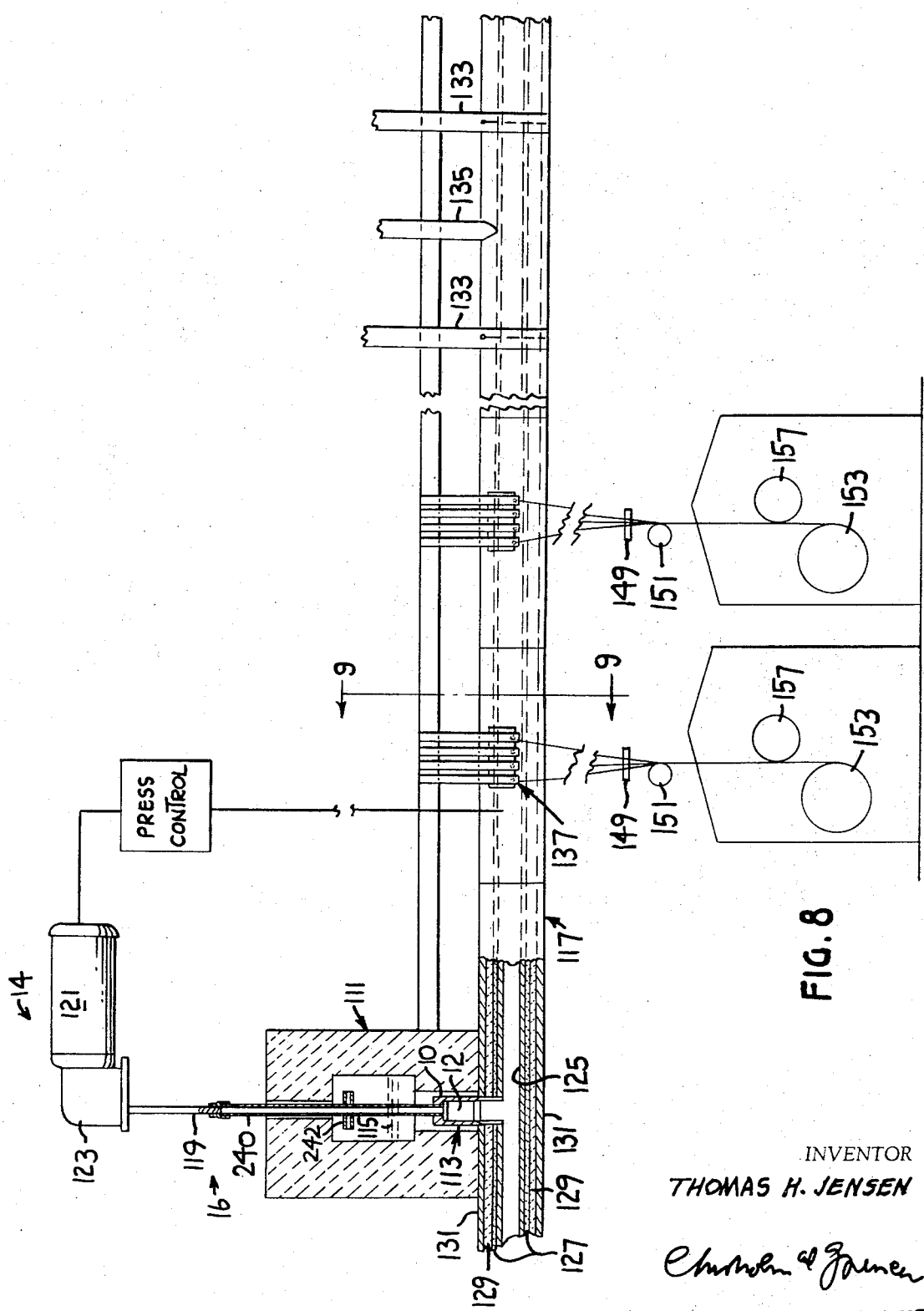

May 15, 1973  T. H. JENSEN  3,733,188
METHOD AND APPARATUS FOR FORMING GLASS FIBERS
Filed May 4, 1971  10 Sheets-Sheet

INVENTOR
THOMAS H. JENSEN

BY
ATTORNEYS

INVENTOR
THOMAS H. JENSEN
ATTORNEYS

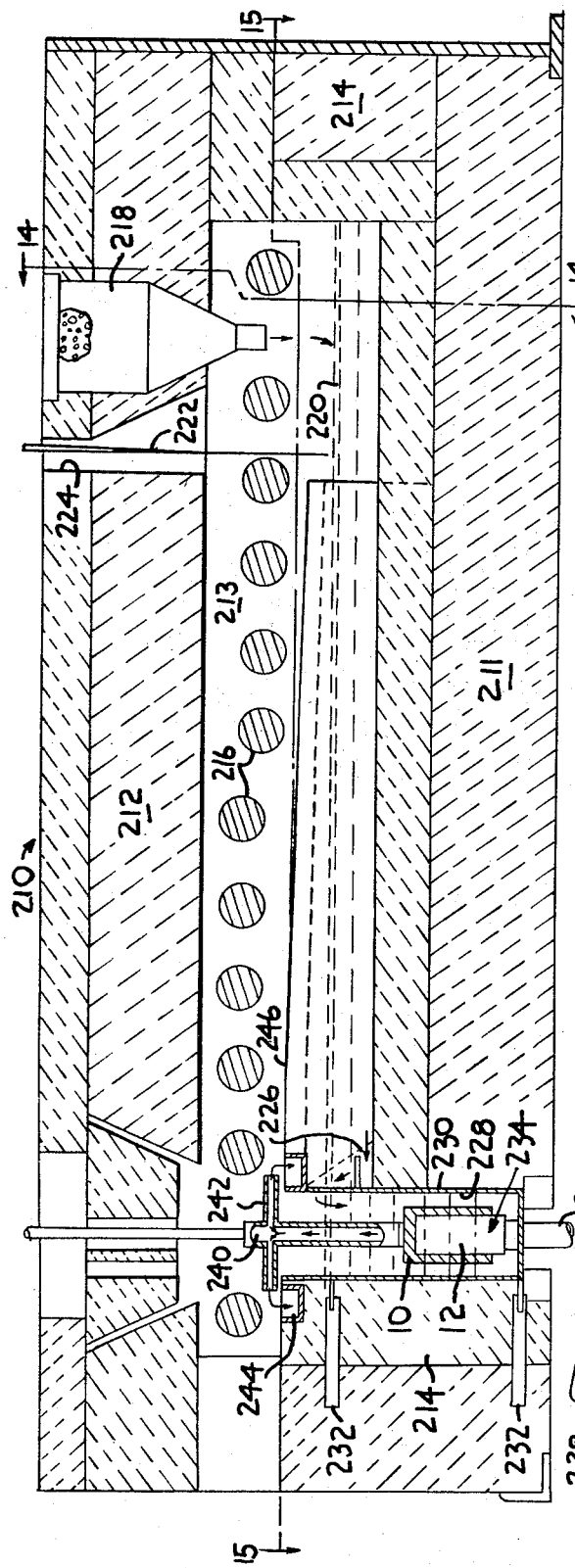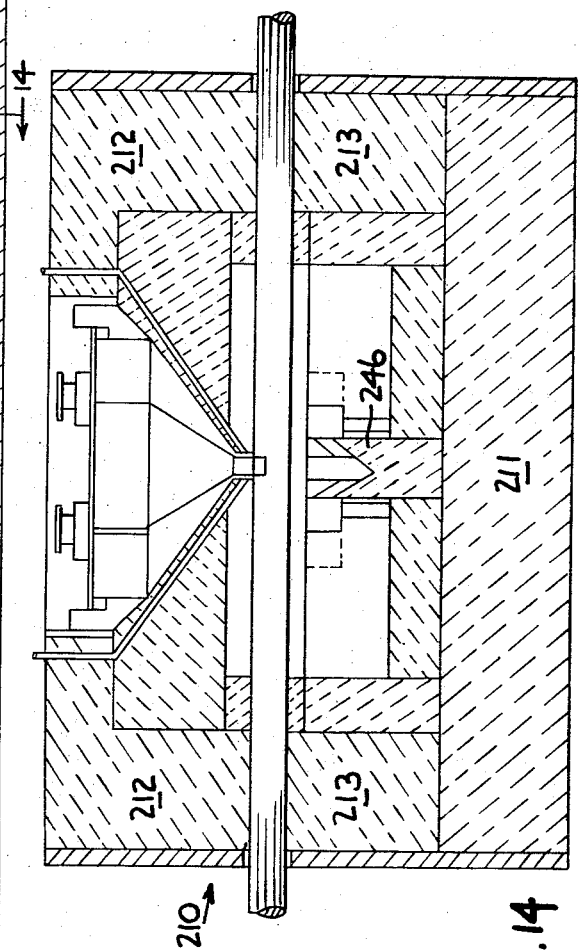
FIG. 13
FIG. 14
INVENTOR
THOMAS H. JENSEN
ATTORNEYS

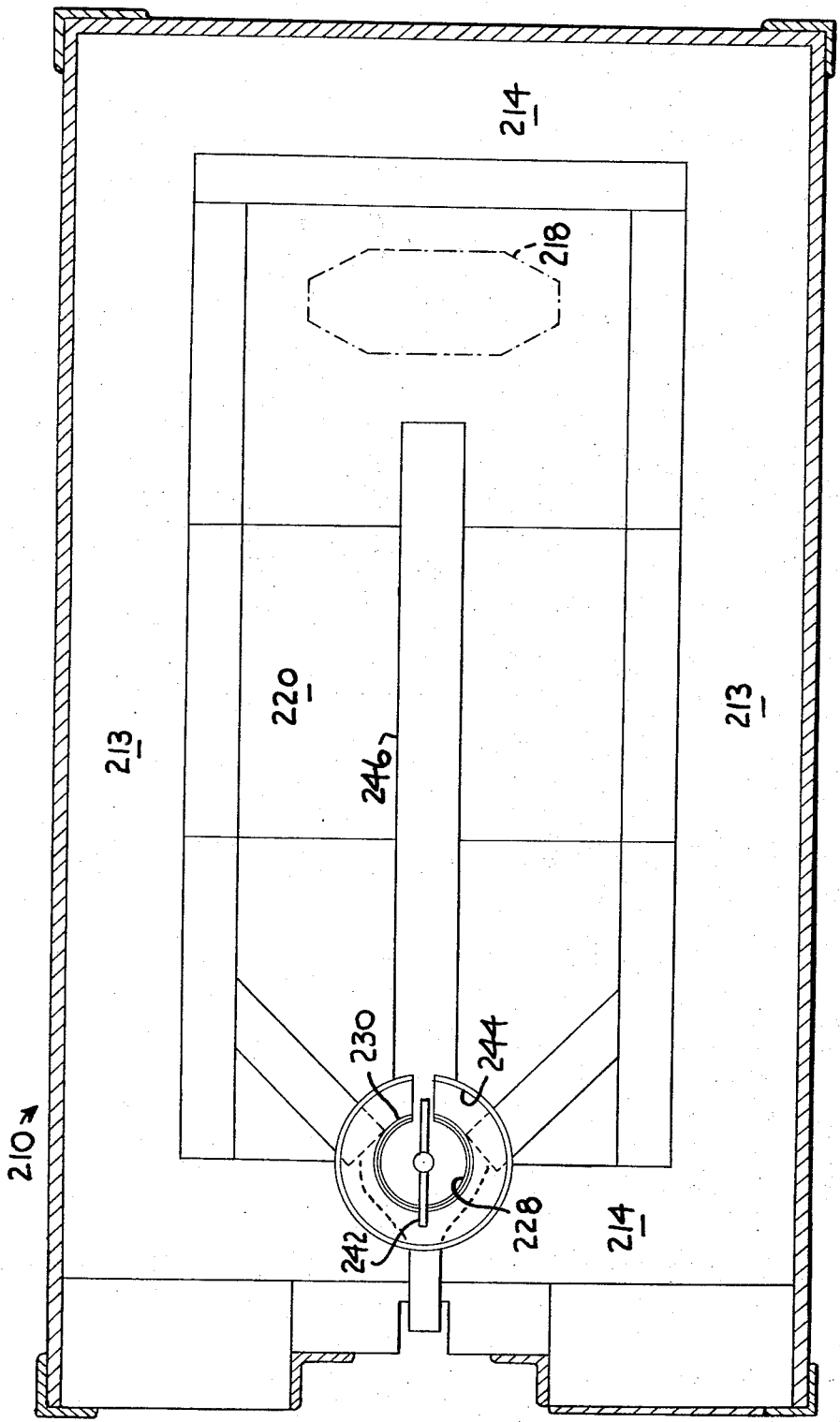

3,733,188
METHOD AND APPARATUS FOR FORMING GLASS FIBERS

Thomas H. Jensen, Murrysville, Pa., assignor to PPG Industries, Inc., Pittsburgh, Pa.
Continuation-in-part of applications Ser. No. 779,684, Ser. No. 779,940, and Ser. No. 779,941, all Nov. 29, 1968, all now abandoned. This application May 4, 1971, Ser. No. 140,220
Int. Cl. C03b 37/02
U.S. Cl. 65—2        15 Claims

ABSTRACT OF THE DISCLOSURE

In the manufacture of glass fibers, molten glass is delivered from a melter-refiner to a two-stage continuous, non-pulsing pumping device which drags a high volume of bubble-containing viscous glass through a first stage at a relatively low shear rate supplying an excess of glass at a modest pressure increase to a second stage which drags a part of the viscous glass through it at substantially higher shear rates thus delivering substantially bubble-free molten glass at higher pressure to a working chamber, while the excess bubble-containing glass, unable to support shear, is rejected from the pump and delivered to a refining chamber with the bubbles concentrated to assist their removal by heating.

CROSS-REFERENCES TO RELATED APPLICATIONS

This application is a continuation-in-part of copending applications Ser. Nos. 779,684, 779,940 and 779,941, all filed Nov. 29, 1968, all now abondoned, all material in each expressly incorporated by reference herein.

BACKGROUND OF THE INVENTION

The present invention relates to the production of glass fibers.

In the manufacture of continuous glass fibers, there are at least two processes, both of which have some steps in common.

In the conventional glass fiber making process glass ingredients, whether in raw batch form or in glass marble form, are melted in a container, such as a glass melting tank, and molten glass flows, perhaps through a canal into an elongated forehearth. At the bottom of the forehearth, there are a plurality of bushings, i.e., generally electrically heated containers fabricated of platinum or a platinum alloy with a plurality of tips each having an opening therethrough for the passage of a stream of molten glass. The streams of molten glass cool rapidly and the glass streams are attenuated into fibers. The fibers, after being coated with a binder, are grouped together to form a strand which is collected on a rotating member as a package. The rotating member is driven by a motor and supplies the attenuating force for attenuating the glass streams. Generally, there is a head of glass in the forehearth, i.e., about eight inches, and provision is made to supply heat to the forehearth in order that the glass is retained at proper viscosity for fiber forming.

In the other process, that of Amos et al., U.S. Pat. No. 3,446,149 and application Ser. No. 556,800 incorporated therein, glass under pressure is extruded through holes in a forming nozzle. Substantially bubble-free glass is required in this process. To supply the bubble-free glass, a single-stage pump is used which pressurizes the glass and also rejects bubble-containing glass. The attenuating device is the same as in the conventional process.

One difficulty of this latter process is the inability of the single-stage pump to evacuate the bubble-containing glass in a continuous manner. The bubbles build up in the pump, col. 4, lines 21–32, Amos et al., and must be purged therefrom which requires an interruption in the process. The bubble build-up causes cavitation with a reduction in pumping effect, such that the process is affected. Another difficulty has been misalignment of the relatively rotatable elements of prior art pumps during operation affecting the mechanical operating reliability of the pump due to seizure between the rotor and stator.

SUMMARY OF THE INVENTION

The present invention provides a two-stage pumping apparatus which is especially adaptable for pumping molten glass in the manufacture of glass fibers wherein glass is extruded through a plurality of holes in a forming nozzle and a pump is capable of rejecting bubble-containing glass, so that bubble-free glass is delivered to the forming nozzle.

In the prior art, the bubble rejection characteristic of a single-stage pump constructed to reject bubbles generally results in a build-up of bubbles in the pumping device which eventually results in a reduction of the pumping effect and passage of bubbles through the pump. This condition generally requires an interruption of the process to purge the pump of air. The device, according to the present invention effectively eliminates this problem by providing continuous purging action of the bubbles to ensure an adequate source of glass at the pumping elements at all times. This is accomplished by constructing the pump of two stages, the first stage providing an excess quantity of liquid required for the process such that bubbles are carried out of the pump by the excess fluid. The second stage supplies sufficient bubble-free glass to the process to provide a substantially continuous trouble-free operation.

As in the case of a single-stage pump, the pump of the present invention is constructed with only two relatively moving elements. Because of the relative softness of the pump material at molten glass temperatures, i.e., machined metal with which glass does not react, such as platinum or platinum alloy, it is imperative that the parts be retained with a substantially fixed clearance therebetween to insure proper operation. Thus, the pumping apparatus is so constructed to include spaced bearings utilizing the viscous liquid as the lubricating media.

The present invention also provides a method wherein molten glass is pressurized by the above described pumping apparatus and the pressurized glass is delivered to a distribution means and then to an orifice tube having a plurality of holes therethrough for the passage of streams of glass which are thereafter attenuated into fibers.

In one form of this embodiment of the present invention, a conventional fiber forming arrangement of a glass melting tank and a T-forehearth can be converted to a pressurized fiber forming arrangement by submerging one or more viscosity pumps described above, in the glass in the forehearth, such that the inlet of the pump or pumps communicates with molten glass and the outlet of the pump or pumps is connected via a distribution means to an orifice tube or a plurality of orifice tubes. No conventional bushings are required in such an arrangement, however, if desired, such bushings may be used in combination with the pump of this invention.

In another form of this embodiment of the present invention molten glass is delivered to the inlet of the pressurizing pumping arrangement and is discharged from the outlet thereof to an insulated distribution means to which a plurality of orifice tubes, as described, are connected. The orifice tubes may be in multiples and in any desired arrangement.

In either arrangement, provision is made for binder applicators, guides which group fibers together as a strand and winders for collecting the strands, the winders generally exerting the attenuating force required to produce the fibers. Other types of winder arrangements can be used, as for example, those using godet wheels for drawing the fibers and rotating members for collecting the fibers.

According to another embodiment of the present invention molten glass which may, and usually does, contain bubbles is pressurized by the pumping device described above which rejects bubble-containing glass, the substantially bubble-free glass being delivered to a forming location, as for example, a bushing or forming nozzle where it may be extruded through holes or openings therein, and the bubble-containing and rejected glass is returned to the source, i.e., a melter-refiner via a trough. In order to remove or substantially eliminate the bubbles in the rejected glass, the rejected glass is subjected to intense heat prior to being returned to the pumping device. Thus, in a continuous process, glass or glass making ingredients are continuously melted to form a source of molten glass. Molten glass which may, and usually does, contain bubbles is delivered from the source to a pump as described above and therein the molten glass is separated into that substantially free of bubbles, which is delivered to a forming area, and into that which is rejected and contains bubbles. The rejected bubble-containing glass is returned to the source of molten glass and intermixed therein and therein subjected to heat to substantially eliminate the bubbles.

To accomplish this procedure, a refractory enclosure referred to as a melter-refiner, is provided in which glass marbles or other glass making ingredients are melted to form the source of molten glass and a pump, as for example, a two-stage viscosity pump described above, are provided. The pump discharges bubble-free glass to a forming area and delivers bubble-containing glass to an inclined trough within the enclosure, such that the glass flows along the trough to the source. Heating elements, as for example, electrically energized glo-bars, in the enclosure provide concentrated refining heat for intensely heating the glass in the refiner and the enclosure which results in the removal of at least some of the bubbles therein. The heating elements also provide the source of heat to melt the glass which forms the source; the temperature established by the glo-bars in the enclosure is above the melting temperature of the glass. Fuel-burning burners can be used in lieu of glo-bars if desired, the main consideration is the provision of a source of concentrated heat.

While the procedure outlined above results in a supply of bubble-free glass to the forming or making area it is desirable to supply sufficient bubble-free glass to ensure a continuous substantially trouble-free operation. It becomes necessary, in order to accomplish this, to deliver an excess quantity of glass to the pump because of the rejection of that portion of the glass in which the bubbles have been concentrated by passage through the pump. Such sufficient supply is ensured by maintaining the level of the glass in the melter-refiner the same as in a container containing the pump. At all times, a head of molten glass is maintained at the inlet of the pump.

It will, of course, be apparent that, while the invention is here described with particular reference to glass fiber making, the invention is applicable generally to the manufacture of products from heat softenable viscous materials which require debubbling prior to working. For example, thermoplastic materials may be processed according to the principles of this invention. The extrusion of thermoplastics to form fibers or extrusions of larger cross-section may be improved by the elimination of bubbles and pressurizing a bubble-free molten material for extrusion according to this invention.

Viscous materials, generally, may be continuously debubbled by the instant invention. Bubble-containing viscous material may be separated into a bubble-free product and the bubbles concentrated into a side stream, thus, overcoming the inherent problem of slow removal of bubbles from viscous liquids as that removal is defined by Stokes Law for buoyant coalescence and separation of bubbles. Since the removal of bubbles from a viscous liquid is constrained by the movement of bubbles to a free surface and overcoming surface tension at the free surface, the present invention provides a significant improvement. No longer is movement of bubbles to a free surface limited to buoyancy rise and diffusion; bubbles are concentrated in a separate small fraction of the original volume of bubble-containing liquid. By depositing this fraction of bubble-containing material in a thin layer on a support, as a trough, or onto the surface of the general mass of bubble-containing liquid the bubbles are concentrated near a free surface and need only overcome the constraint of surface tension to escape. Heat may be effectively applied to reduce surface tension and aid the escape of bubbles from liquid after the bubbles are concentrated at the surface.

Throughout the present discussion the terms "bubble-containing" and "bubble-free" are used for convenience. In reality one continuous mass of molten glass containing some bubbles is provided by a glass melter and refiner. This glass when dragged through the pump of this invention is separated into two streams: one substantially bubble-free which is delivered under pressure to a working location, zone or forming means; and a second, generally smaller, stream containing all or substantially all of the bubbles from the original mass of glass is discharged to be discarded or debubbled. The first stream is referred to as bubble-free; the second stream, in which the bubbles have been concentrated, is referred to as a bubble-containing stream.

BRIEF DESCRIPTION OF THE DRAWINGS

The invention will be illustrated, by way of example with reference to the accompanying drawings, in which:

FIGS. 3, 4, 5, 7A and 7B are sectional views taken on lines 3—3, 4—4, 5—5, 7A—7A and 7B—7B respectively of FIG. 2;

FIG. 6 is a curve representing the velocity profile of viscous liquid in a pumping cavity;

FIG. 8 is a partial sectional longitudinal view showing a fiber forming apparatus of one embodiment of this invention;

FIG. 13 is a longitudinal section of a typical fiber forming apparatus of this invention showing an arrangement for treating bubble-containing glass rejected by the pump and having bubbles concentrated relative to the general mass of molten glass;

FIG. 14 is a view taken on line 14—14 of FIG. 13; and

FIG. 15 is a view taken on line 15—15 of FIG. 13 looking in the direction of the arrows.

BRIEF DESCRIPTION OF THE PREFERRED EMBODIMENT

Figure 1:
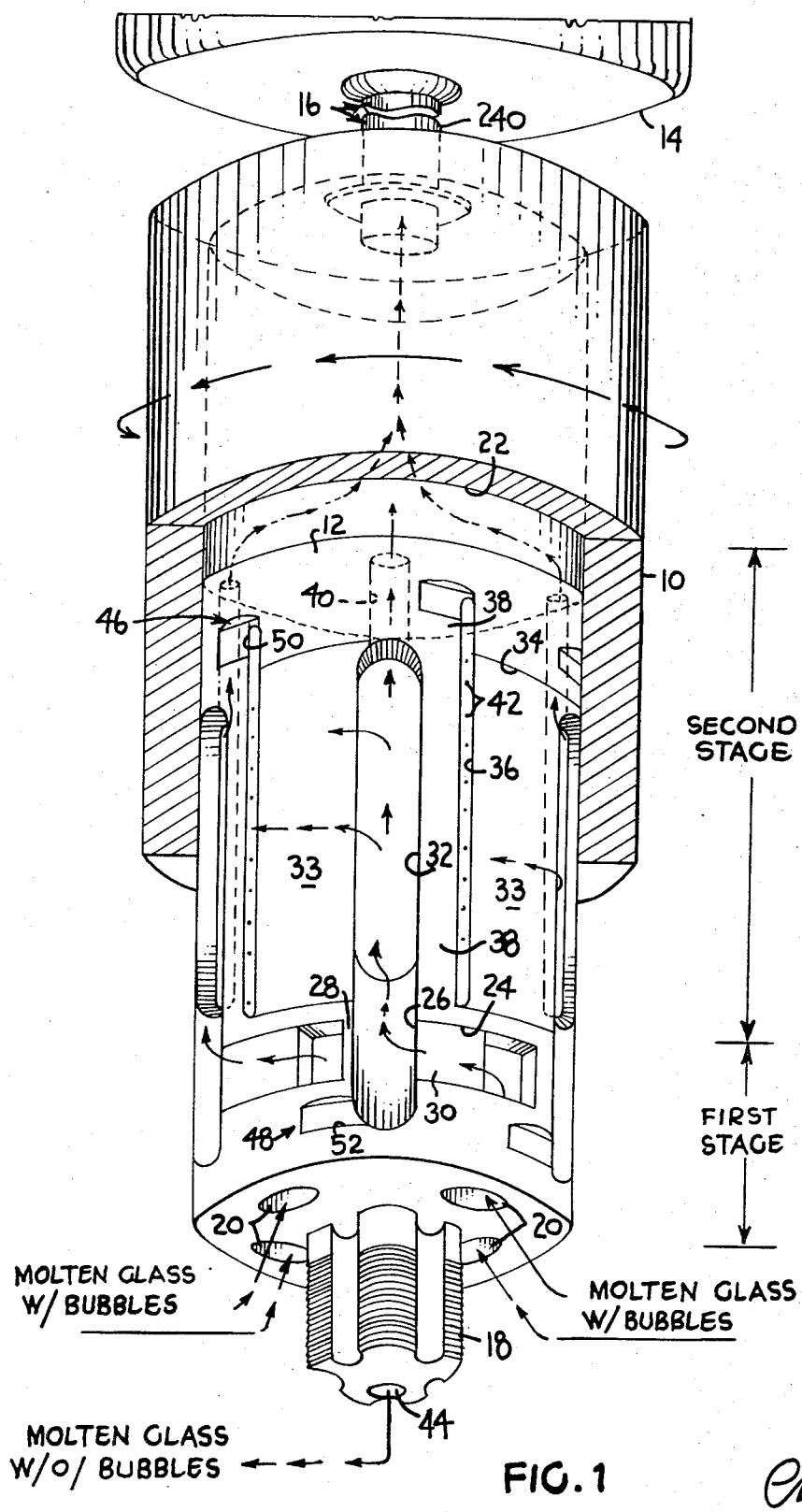
FIG. 1 is a partially exploded perspective view with parts broken away illustrating the pumping apparatus of this invention by arrows, the path of the liquid being pumped and the direction of rotation of the rotor element.
Figure 2:
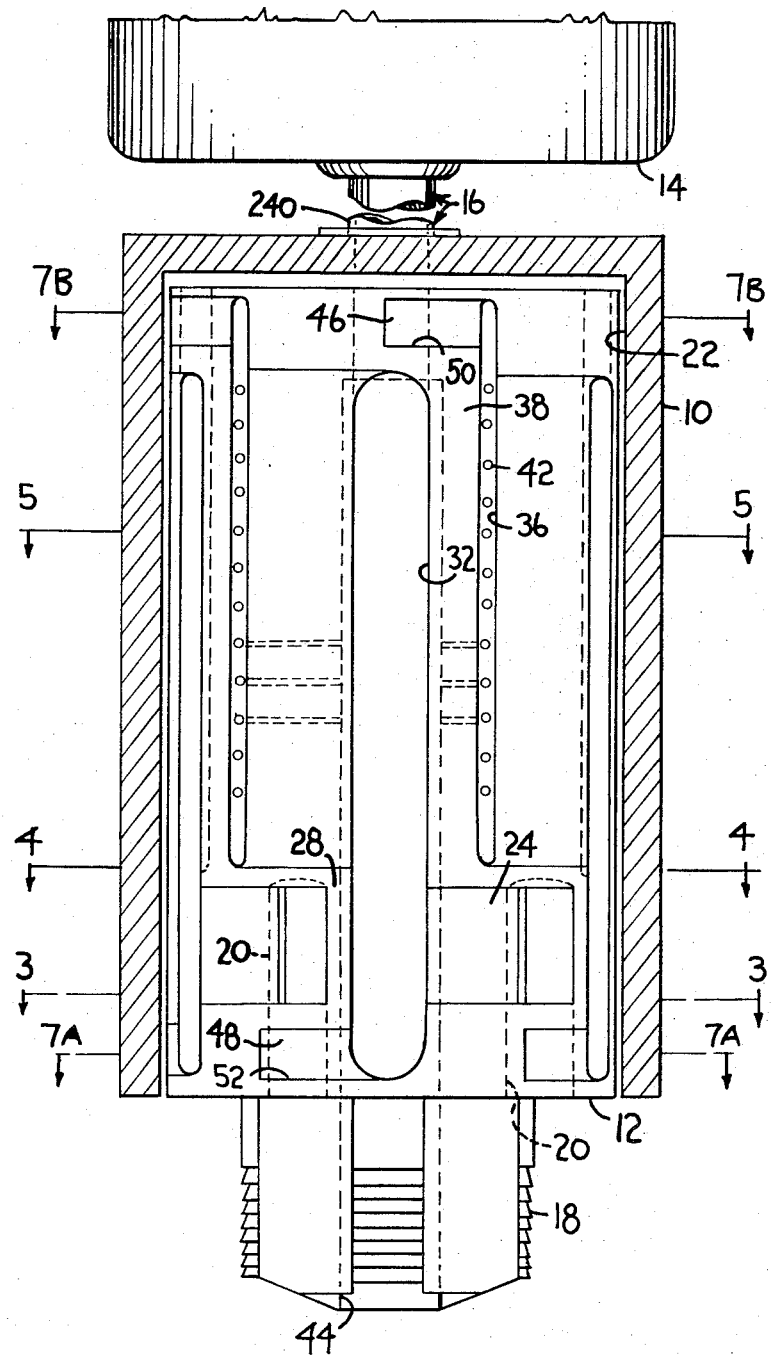
FIG. 2 is an elevational view, partially in section of the pumping apparatus of FIG. 1.

FIGS. 1 and 2 illustrate in its entirety, a pumping apparatus which includes relatively rotatable elements 10 and 12. In the embodiment illustrated the element 10, which is relatively smooth and continuous, is the rotor and rotates about the stator or element 12. The element 12 is configured as will be described. A drive means 14 is connected through a coupling means 16 (details of which are later described) to the rotor 10 capable of rendering the rotor in a "floating" situation, free to assume the position necessary for perfect alignment with the stator. In operation, the pumping apparatus is submerged or partially submerged in the liquid to be pumped and pressurized. The stator 12 is provided with a screw-threaded projection 18 for connection with the floor of a container or pot (not shown) into which the liquid to be pumped and pressurized is delivered. A plurality of bores or passages 20 form inlets for the liquid in the first stage of the apparatus, which liquid is dragged along stationary surface 30 by the moving surface 22 of the rotor 10 in the direction of the arrows in FIG. 1. Thus liquid from each inlet 20 is dragged through a first relatively large clearance or chamber 24 toward cavity 26 machined in the stator 12. Second, smaller clearances 28 are defined at the opposite side of the cavity 26, such that liquid moving therethrough can leak into a second adjacent inelt 20. The clearance, 28, is desirably minimized to minimize leakage and enhance pumping efficiency; however, since the rotor must move with respect to the stator some clearance must exist.

Assuming that there is no back pressure in the cavity 26, the speeds of various portions of the liquid in the chamber 24 vary linearly from a maximum of the speed of the surface 22 where the liquid is in contact with this surface to zero where the liquid is in contact with the opposite surface 30 of the chamber 24. The average speed of the liquid in the chamber 24 is one-half the speed of the surface 22 and the rate of flow through the chamber 24 may be calculated by multiplying one-half the speed of the surface 22 by the cross-sectional area of the chamber 24. A similar calculation can be made to determine the rate of flow of the liquid through the second smaller clearance or chamber 28. Because more liquid flows through the chamber 24 than can exit through the more restricted chamber 28, the excess flows through the cavity 26 into cavity 32.

Inasmuch as the first stage of the pumping apparatus is intended to pump liquid at relatively high volumes and low pressure, as well as to pass any bubbles which may be trapped in the liquid, the depth of each chamber 24 is relatively large as compared with the diameter of the average bubble in the liquid, which for viscous glass can range up to 1/16 inch in diameter. Thus the first-stage chambers or recesses 24 produce low shear rates and low pressure gradients in the liquid.

Each cavity 26 of the first stage generally continued and merges into an inlet cavity 32 for the second stage of the pumping apparatus. Liquid from each cavity is dragged along stationary surface of recess 34 by the moving surface 22 of the rotor 10 in the direction of the arrow in FIG. 1. Thus liquid is dragged through each first clearance or recess 34 toward a high-pressure cavity 36 machined in the stator 12. Second and smaller (both in depth and length) clearances 38 are defined between cylindrical surfaces 30 of the stator and 22 of the rotor at the opposite side of each high-pressure cavity 36. The clearances 34 and 38 are each substatnially uniform in depth (although not equal in depth) and the depth of each space 34 is less than that of each space 24 of the first stage so as to produce much higher shear and pressure gradients.

In the first stage of the pump being described, glass is dragged between the moving surface 22 of the rotor 10 and the stationary surfaces 30 of first recesses or chambers 24 defining first relatively large clearances between the rotor and stator; this drag forces glass drawn through inlets 20 into a first-stage outlet cavity 26 with a small portion of the glass leaking across surfaces 28 and a further portion being forced into wedge bearings 48 across surface 50 which defines a wedge with the interior surface 22 of the rotor. Except for leakage, all the glass entering the inlets 20 is forced through the cavities 26 into the inlet cavity 32 of the second stage.

In the second stage, glass is dragged between the moving surface 22 of the rotor 10 and the stationary surfaces 33 of second recesses or chambers 34 defining relatively large (though generally smaller than those defined by first recesses 24) clearances between the rotor and stator; this drag forces glass into high-pressure cavities or outlet chambers 36 but due to the relative clearances and chamber sizes of chambers 34 and 24 some glass exits cavities 32 axially through the top of the stator. Within the chambers 34 the drag generates positive (in the direction toward the high-pressure outlet) and negative (in the direction away from the high-pressure outlet) flow conditions, FIG. 6, for any output pressure greater than the inlet pressure. In the negative flow area, there is a location of zero shear to which the bubbles migrate (since they are unable to support a shear). As long as the positive flow portion is greater than the negative flow portion there will be a net flow of liquid to the second stage output cavity 36, the resultant is a supply of high pressure, bubble-free process glass and a negative flow of bubble-containing glass back to cavity 26 and then is forced-out through the passage 40 and through the outlet conduit 240 of coupling 16. The bubble-containing liquid can be discharged and treated as described below or it can be discharged in any suitable manner.

The curve of FIG. 6 illustrates the velocity profile for a Newtonian fluid such as viscous glass across a pumping cavity, as for example, a high-pressure clearance 34 when the output pressure is greater than the inlet pressure. The velocity of the liquid at the stator surface, noted as $V_s$, is equal to zero while the velocity of the liquid at the rotor surface, noted as $V_R$, is the velocity of the rotor. If the Y axis is drawn through the point $V_s$, the area to the left of the axis when the curve, noted as A, represents the negative flow area to which the bubbles, unable to support shear, migrate. The area to the right of the axis, noted as B, represents positive flow conditions, the difference of which represents the net throughput of the pump.

The liquid which is pressurized by the movement of the elements 10 and 12 relative to one another and by its movement through a clearance 34 into a high-pressure cavity 36 flows through a radial outlet passage 42 into a central outlet bore 44. The central bore 44 is connected by suitable means to a working station or process.

In order that the stator and the rotor be properly aligned during the relative rotation therebetween, upper and lower bearings 46 and 48, respectively, are provided. The upper bearings are formed by providing cut-out portions in the stator 12 to thus form, with the rotor 10, spaced upper wedge-shaped bearing chambers or recesses 46 are defined by wedge surfaces 50, each communicating with a second-stage cavity 36 to receive liquid therefrom. The chambers 46 are equally spaced around the periphery of the stator 12. In a similar manner, the lower bearings are formed by providing cut-out portions in the stator 12 to thus form, with the rotor, spaced lower wedge-shaped bearing chambers or recesses are defined by wedge surfaces 52, each communicating with a first-stage cavity 26 to receive liquid therefrom. The chambers 48 are equally spaced around the periphery of the stator 12. In both cases, the liquid being pumped and pressurized forms the lubricating media through the wedging action occurring on the glass by the moving surface of the rotor 10. Each of the bearings is independent of the others, such that in the event of misalignment of the stator and rotor, the pressures therein act to equalize one another and reestablish the alignment of the elements.

To perform properly it is important that the angle formed between the surfaces 50 and 52 of the wedge bearings and a line tangent to the circumference of the stator at the point of intersection between the wedge and the circumference or surface 30 be small, preferably less than 15° and angles of about 2° to 5° are more preferred. The wedge may be flat for ease of machining the stator to construct the bearings thereon, but a curved wedge surface having an effective angle of the indicated magnitude performs best.

For greatest effectiveness each wedge bearing should have a limited peripheral length relative to its area. Such a relationship between the periphery and area minimizes the escape of the viscous lubricating liquid permitting effective pressurization to stabilize the rotor in relation to the stator. The upper and lower bearings are preferably not in communication with one another for, since the bearings act to balance the rotor with the stator as pressure induced forces on a lever having a combined arm length equal to the effective spacing between the upper and lower bearings, any communication between the bearings tends to dissipate this effect. Further the axial length of the bearings should be minimized and the bearings located as close as practicable to the upper and lower extremes of the stator to maximize lever arm length, the forces acting near the axis of instability between the rotor and stator are ineffective to restore balance between the pump elements.

To prevent seizing between the rotor and stator should they contact in operation despite the presence of bearings it is desirable to prevent sharp edges of the stator from contacting the rotor. Therefore, it is preferred that a complete, uncut circumference exist at the upper and lower extremes of the stator.

A typical two-stage pump, as described, is constructed of machined castings of a platinum alloy which will not react with viscous, molten glass. The stator is 2 13/16 inches in length, excluding the threaded portion of connection to a support, and 1 7/16 inches in diameter. The clearance between the rotor and stator is 0.003 inch. The rotor is cup-shaped with an internal depth of 3 9/32 inches.

The first-stage spaces or chambers 24 and 28 have a working height of 7/16 inch, depths of 0.333 inch and 0.003 inch, respectively, and peripheral lengths of 0.332 inch and 0.090 inch, respectively. The second-stage spaces or chambers 34 and 38 have a working height of 1 11/16 inches, depths of 0.008 inch and 0.003 inch, respectively, and peripheral lengths of 0.420 inch and 0.167 inch, respectively. There are five inlets and outlets in the pump and a similar number of spaces or chambers as identified previously.

The rotor is rotated from 30 to 60 r.p.m., delivering molten glass at a viscosity of 300 to 400 poises, suitable for fiberizing, at a rate of 20 to 25 pounds per hour at 150 to 200 p.s.i. or at substantially higher volumes and lower pressures.

The volume output from a pump will vary inversely with output pressure and as the cube of its physical size, i.e., if the rotor and stator diameters and lengths of a typical pump as described were doubled while maintaining essentially unchanged cavity depths and clearances, its capacity would increase by a factor of eight. This is because at a given rotational speed the larger pump provides twice as many cavities, each of twice the length and the linear speed of the rotor relative to the stator is also doubled.

Referring to FIGS. 8 to 12, a method of producing glass fibers will be described.

Figure 9:
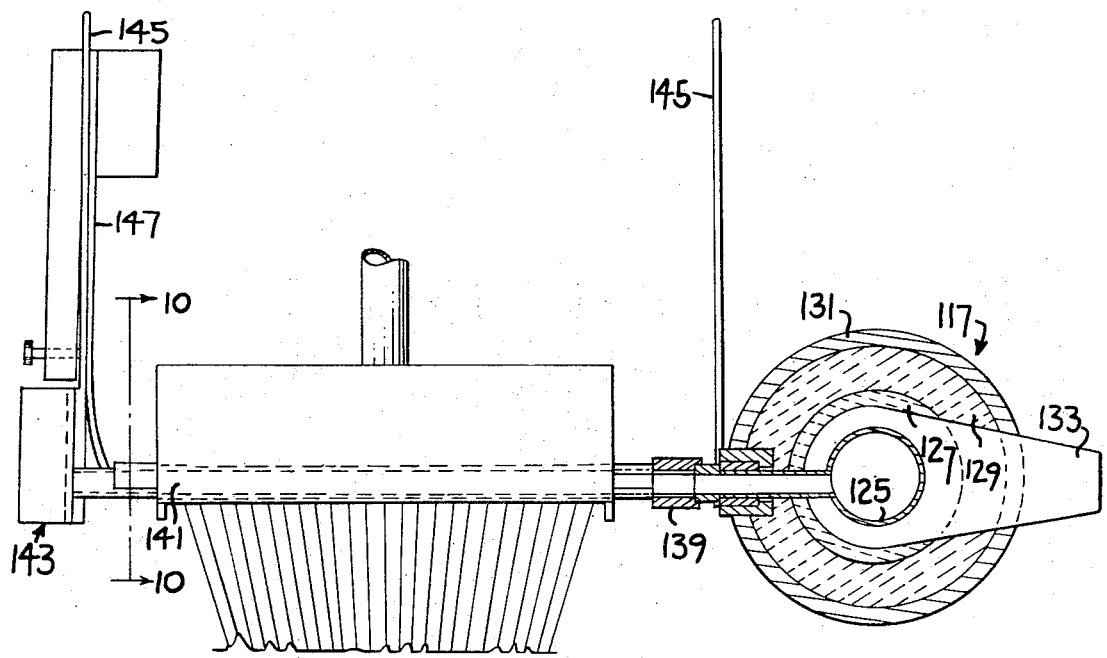
FIG. 9 is an enlarged sectional view taken on line 9—9 of FIG. 8.
Figure 10:
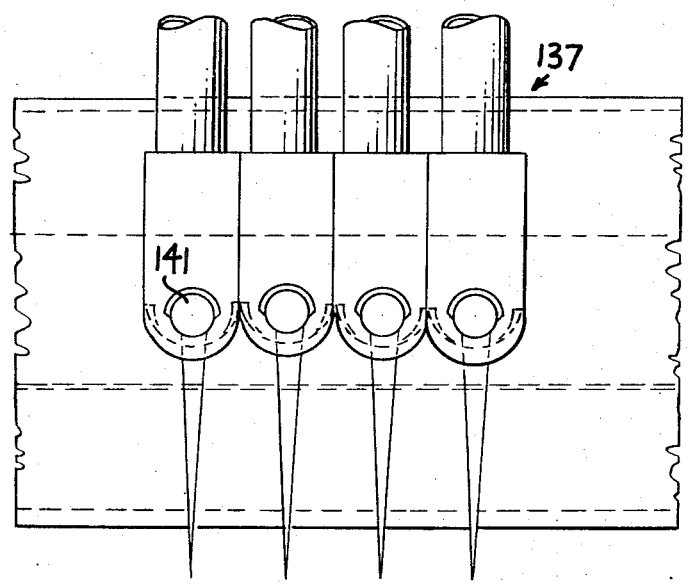
FIG. 10 is a view taken on line 10—10 of FIG. 9.

The embodiments of FIGS. 8, 9 and 10 utilizes the canal 111 of a conventional glass melting tank (not shown) which canal is modified to receive a pumping device 113, such as a viscosity pump, as described above, with its inlet in communication with molten glass 115 in the canal 111 and its outlet connected to a distributing means 117. The rotor of the pumping device 113 is driven by a shaft 119 connected to a motor 121 through a variable speed gear box 123 which can be controlled by a pressure sensing control circuit to maintain constant pressure output.

The distributing means 117 includes an elongated tubular member 125 constructed of an alloy which will not contaminate molten glass, such as a platinum-rhodium alloy, surrounded by insulating layers 127 and 129, generally arranged such that the insulating layer 127 is of high density and the insulating layer 129 is of low density. A tubular housing 131 constructed, for example, of steel surrounds the layer 129.

Provision is made to electrically resistance heat the member 125 by providing spaced bus bars 133 connected to the member 125 for connection to a source of electrical power (not shown). With such bus bars the heating of individual segments of the member 125 may be controlled. To assist in maintaining the desired temperature, provision is made to use thermocouples 135 for each section of the member 125. Automatic temperature controlling circuits (not shown) can be used. Although the distribution means, 117, could be supplied with heat along its entire length from a single heating source, it is preferred to provide for segmented heat input to compensate for segmented glass withdrawal and disparate molten glass flows in separate segments of the tubular member, 125.

At each individually temperature controlled section of the member 125, one or more orifice tube connection assemblies 137 is provided, and mating with a part of each assembly 137 is a nipple 139 which is connected to an orifice tube 141, such that molten glass can enter the connected orifice tube 141, flow under pressure from each hole therein. The end of the orifice tube 141 opposite the nipple 139 is generally closed and is supported by a connector and air cooling block assembly 143. In order that the glass in the orifice tube 141 be maintained at the proper temperature for forming, the tube 141 is electrically resistance heated by being connected to spaced bus bars 145. The bar 145 is connected to the assembly 137; the bar 147 contacts a rigid shield for the tube 141, being resiliently urged thereagainst, as is illustrated to insure a seal at the nipple 139, i.e., the connection for the pressurized glass.

Preferably the orifice tube, 141, extend beyond the bus bar, 145, or other electrical connector remotely disposed from the distribution means so that the cooling block assembly, 143, which contacts the end of the orifice tube, 141, can maintain the glass therein colder and more viscous than glass between the electrical connectors. Such an arrangement eases the removal of single orifice tubes, 141, from service by quickly-sealing the ends with solidified glass.

To minimize disruption of the drawing of fibers from adjacent or nearby forming positions or orifice tubes each individual tube has at least two electrical connections so that a complete circuit is provided at each tube despite the removal of other tubes.

Below the orifice tube 141 is a conventional binder applicator 149, a gathering shoe 151 and a winder assembly 153. The winder assembly includes a rotating winding spindle 155 driven by a motor (not shown) for receiving a forming tube onto which the fibers are wound and a traversing cam 157 which distributes the fibers along the tube in overlying layers.

The orifice tube 141 is described and claimed in applicant's copending application Ser. No. 779,934, filed Nov. 29, 1968.

Figure 11:
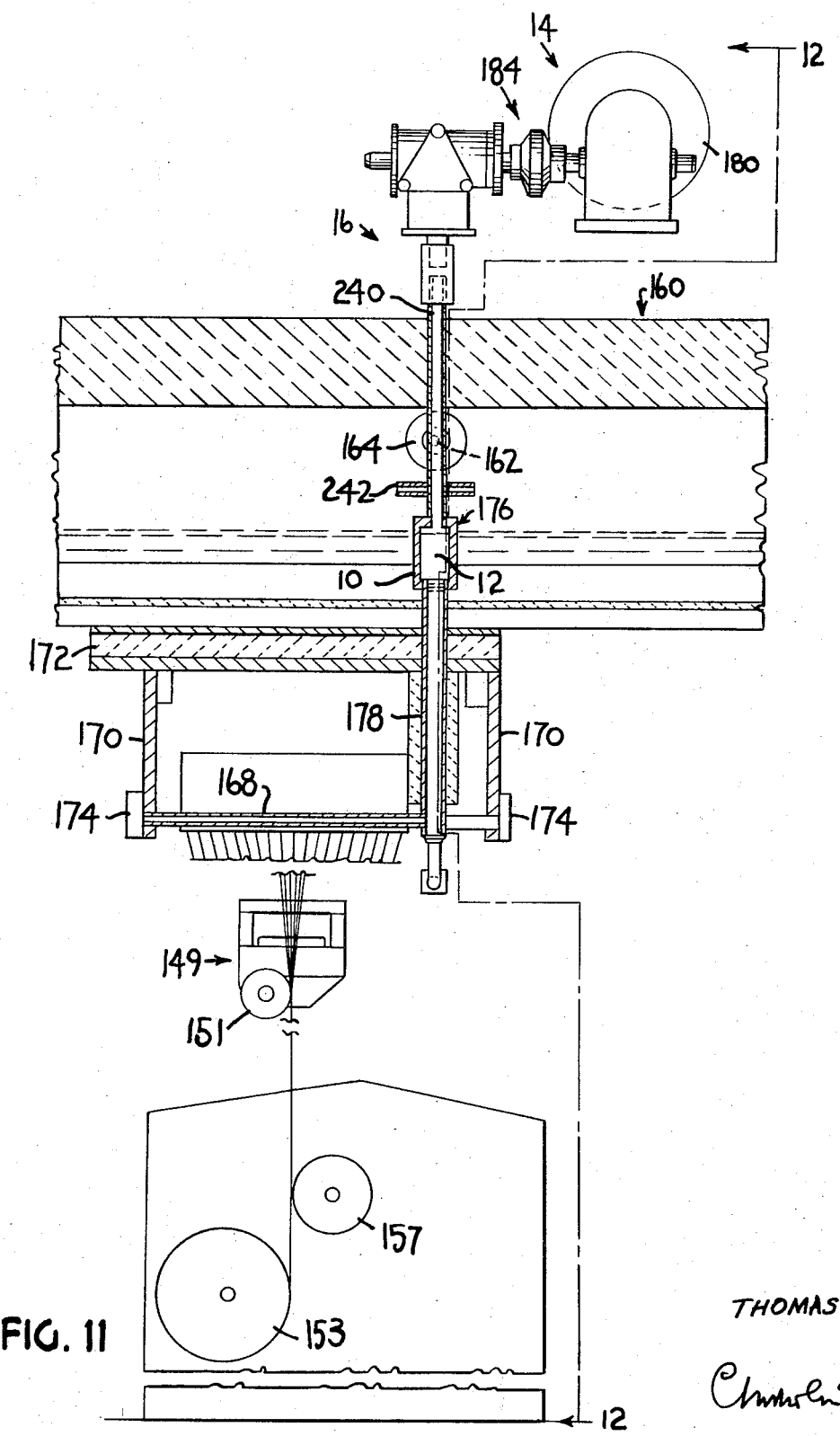
FIG. 11 is a partial sectional longitudinal view of another embodiment of a fiber forming apparatus of this invention.
Figure 12:
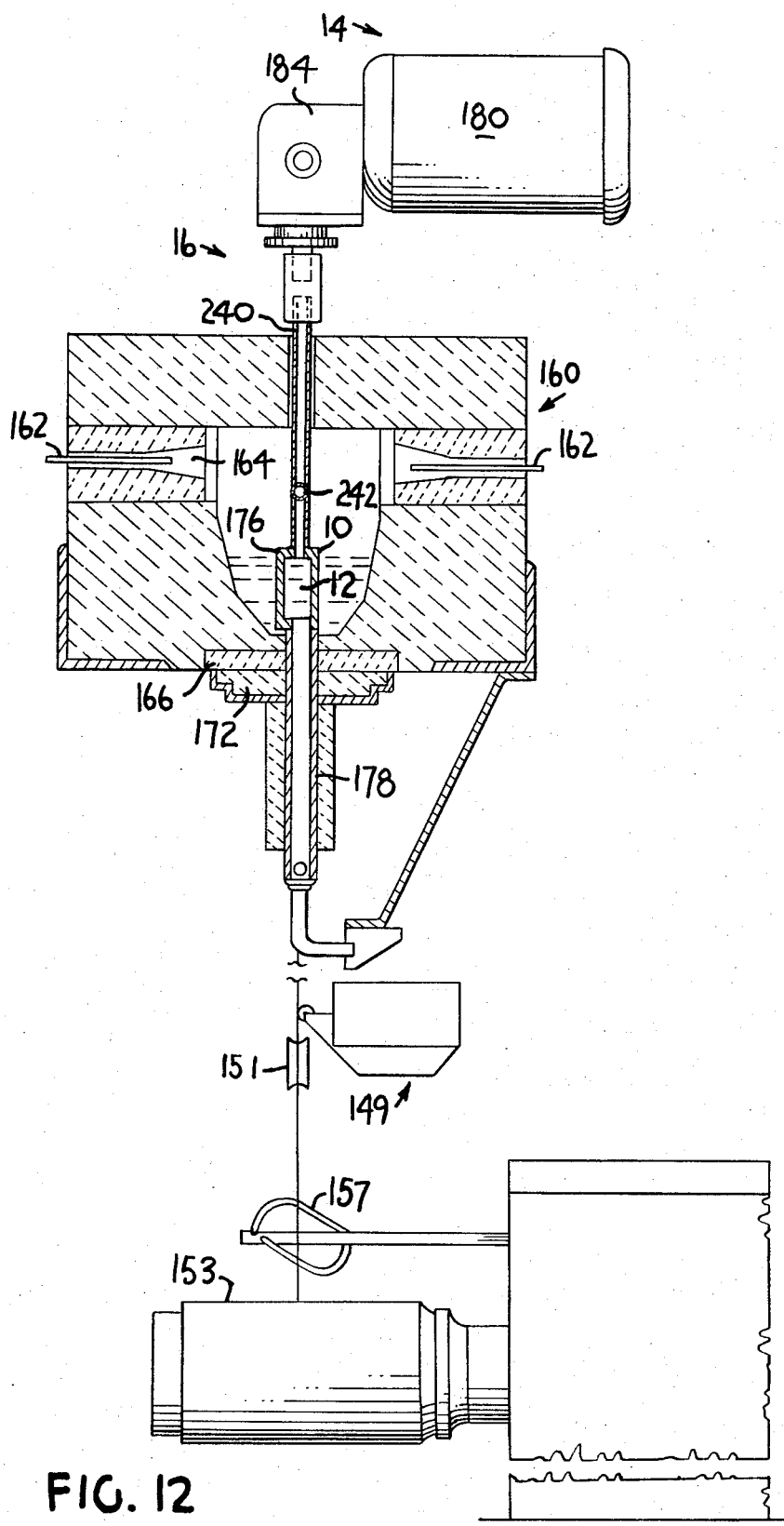
FIG. 12 is a view taken on line 12—12 of FIG. 11.

FIGS. 11 and 12 illustrate another embodiment of the invention, which utilizes a substantially conventional fiber forming forehearth 160 connected to a glass melting tank (not shown) heated by gas burners 162 in side ports 164 and is modified by having a substantially continuous bottom wall 166 instead of one constructed to receive prior art bushings. The bushings are replaced by orifice tubes 168 supported by mounting bars 170 insulated from the forehearth by insulation 172. Each orifice tube is electrically resistance heated by constructing the supports 170 as bus bars and is disposed between a pair of cooling blocks, 174. To deliver glass to each orifice tube 168, a viscosity pump 176 is located in the forehearth such that its inlet receives glass and its outlet delivers glass via an insulated distributing means 178 to the orifice tube 168. The rotor of the pump 176 is driven by being connected to a motor 180 by means of a vertical outlet pipe or conduit 240 as part of drive coupling shaft 16 through a variable speed gear box 184.

Below the orifice tube is a conventional fiber forming assembly including a binder applicator 149, a gathering shoe 151, a winder 153 and a traversing means 157. The function of such apparatus has been explained previously in connection with the previous embodiment and further discussion is considered to be repetitious.

The orifice tube 168 and the viscosity pump 176 in this embodiment are essentially the same as the orifice tube 141 and the viscosity pump 113 in the last described embodiment.

FIGS. 13, 14 and 15 illustrate the treatment of bubble-containing glass obtained from the viscosity pump.

In the apparatus as depicted in FIGS. 13, 14 and 15 of the drawings, an enclosure or a melter-refiner 210 is constructed of clay refractory blocks and has a bottom, top, side, and end walls 211, 212, 213 and 214, respectively. A series of glo-bars 216 span the enclosure and each glo-bar is suitable and controllably connected to a source of electrical current (not shown), such that the glo-bars, when properly energized supply sufficient heat to refine glass or melt glass making ingredients received in the enclosure. In other words, for the usual fiber forming glass, the temperature of the source-refiner will be maintained above 2600° F. Of course, the throughput of the source-refiner must be such that there is sufficient time for each increment of glass or glass making ingredient to melt and/or to be refined. Bubbles can and will be rejected, unmelted batch etc., can upset the entire process. The glo-bars 216 can be replaced with fuel-burning burners if desirable, so long as there is a source of heat for the glass. At one end of the enclosure there is a hopper 218 supported by the top of the enclosure 210 into which glass marbles are fed at a controlled rate. The hopper also acts as a premelter for the marbles. The glass of the marbles in molten condition flows from the bottom of the hopper 218 into a pool 220 of molten glass in the enclosure. Control of the feed rate of the marbles is by a level probe 222 which passes through an opening 224 in the top 212 of the enclosure. Level probes are conventional in glass melting furnaces and require no further description. Molten glass from the enclosure passes through opening 226, below the level of the pool 220 into a pump chamber 228 lined with a metal liner 230. The metal liner is electrically heated by having connected thereto spaced bus bars 232 across which an electrical potential is applied. Molten glass in the pump chamber flows into a pressurizing pump 234, having a rotor 10 and a stator 12 which separates bubble-free glass and bubble-containing glass and rejects the bubble-containing glass. The pump is described in detail above. To maintain continuity of pumping and prevent cavitation, an excess quantity of viscous glass, i.e., more than required for forming, is delivered to the pump. Sufficient marbles are fed into the hopper 218 to ensure a head of glass in the pump chamber over the submerged pump such that a quantity of glass in excess of that required for working is fed to the pump. Glass which is bubble free is delivered under pressure through a pipe or conduit 237 to a forming area, such as any forming nozzle 238 but preferably is distribution means, 117. Bubble-containing glass, rejected by the pump 234 flows upwardly through an outlet pipe or conduit 240, a part of the coupling means 16 which drives the pump rotor 10, and then outwardly through bubble rejection outlet tubes 242 into a circular trough 244 having a communication with an elongated inclined trough 246. The trough 246 opens into the enclosure 210 such that glass therein is subject to heat from the glo-bars 216. Gas released from the gas-containing glass exits to the atmosphere through various openings in the roof of the enclosure 210. The rejected glass in the trough is discharged into the pool 220 of molten glass near the hopper 218. The glass from the trough 246 mixes with incoming glass from the hopper, is exposed to the heat supplied by the glo-bars 216 and flows again to the pressurizing pump 234. Alternatively the bubble-containing glass may be distributed in a thin layer on any suitable surface, and after heating and de-bubbling it may then return to the mass of molten glass or fed directly to the pump chamber 228. The bubble-containing glass may also be deposited in a thin layer on the surface of the mass of molten glass; due to the bubbles, the low density they will remain at the surface and be released quickly upon application of heat, including the heat derived from the molten mass of glass beneath the bubble-concentrated layer at the surface.

The two-stage pumping apparatus of this invention may be usefully employed when mounted in a pumping chamber in any orientation; for example, the pump may be effectively used when mounted to rotate about a horizontal axis. Thus, it must be recognized that the use of words such as "top" and "bottom" and the like which ease a visualization and understanding of the pump are not intended to be limiting. Rather, the claims are intended to encompass equivalent pumps, however disposed for operation.

Further, as will be evident to one skilled in the art, the cylindrical shell designated throughout as a rotor could be mounted in fixed relation to a pumping chamber, and the configured element designated throughout as a stator could be movably mounted to rotate within the shell. Thus, the roles of the elements as rotor and stator may be readily interchanged. By the claims, which follow, it is intended to claim the relatively rotatable elements, rotor and stator, whichever rotates or moves relative to the pumping chamber in which the pump is employed. The words "rotor" and "stator" are intended to be descriptive rather than limiting, and equivalent pumps, irrespective of their motion, are intended within the scope of the accompanying claims.

The accompanying claims, while to be construed in view of this description, are not intended to be limited by it.

I claim:

1. A pumping apparatus for pumping a viscous liquid containing gaseous inclusions and delivering separate streams of a viscous liquid containing gaseous inclusions and of a viscous liquid substantially free of gaseous inclusions, comprising:
 a cylindrical stator having top and bottom surfaces and a ciricular sidewall surface,
 a hollow cylindrical rotor surrounding and axially aligned with said stator, said rotor having a wall at the top thereof, an opening at the bottom end thereof and an inner sidewall surface adjacent said stator sidewall surface, and having an outlet passage adjacent the top surface of said stator for emitting a viscous liquid containing gaseous inclusions from said pump,
 said cylindrical stator having:
  (A) an outlet passage therein terminating in an outlet in the lowermost surface thereof for emitting a viscous liquid substantially free of gaseous inclusions,
  (B) at least one outlet passage terminating in an opening in the top surface of said stator for conducting viscous liquid containing gaseous inclusions to said rotor outlet passage, (C) a plurality of inlet passages each extending upwardly from an opening in the bottom surface of said stator, for introducing a viscous liquid containing gaseous inclusions into said pump, (D) a plurality of first recesses in the sidewall surface of said stator, each of said first recesses terminating in a bottom surface spaced from the inner sidewall of said rotor and being elongated and extending in a direction circumferentially with respect to the direction in which the common axis of said rotor and stator extend, each of said inlet passages leading to a corresponding one of said first recesses, (E) a plurality of elongated recesses in the sidewall surface of said stator each communicating with an outlet passage (B), said outlet passage (B) being in communication with said rotor outlet passage, each said stator outlet passage (B) thereby being in communication with one of said first recesses (D), (F) a plurality of second recesses in the sidewall surface of said stator, each of said second recesses terminating in first and second spaced longitudinally extending edges, and terminating in a bottom surface spaced from the inner sidewall surface of said rotor, each said second recess extending in a direction substantially parallel to the common axis of said rotor and stator, each said outlet passage (B) being in communication with one of said second recesses, the first edge of said second recesses being adjacent a corresponding one of said elongated recesses (E), (G) a plurality of narrow third recesses in the sidewall surface of said stator, each of said third recesses terminating in a bottom surface spaced from the inner sidewall surface of said rotor and being adjacent the second longitudinal edge of a corresponding second recess (F), said third recesses each being provided with a plurality of outlets each of which communicated with passages which, in turn, communicate with said stator outlet passage (A), each of said first recesses (D) having the bottom surface thereof spaced from the inner sidewall surface of said rotor a distance sufficient to maintain the pressure and shear of the viscous liquid flowing therethrough at a value which causes the flow in high volume of a viscous liquid containing gas inclusions into each of said stator outlet passages (B) and said second recesses (F) having the bottom surface thereof spaced from the inner sidewall surface of said rotor a distance sufficient to maintain the pressure differential and shear rate of the viscous liquid flowing therethrough at a value whereby the viscous liquid flowing through each said second recess into each adjacent third recess (G) and thence to said outlet passages communicating with said outlet passage (A) is substantially free of gaseous inclusions while the flow of viscous liquid containing gaseous inclusions is confined to said outlet passage (B).

2. The apparatus of claim 1 wherein said rotor and stator are maintained in spaced relation by bearings provided by (H) a plurality of fourth recesses in the sidewall surface of said stator, each of which fourth recesses terminates in a bottom surface angularly spaced from the inner sidewall surface of said rotor and communicates with and receives from an adjacent outlet passage (B) a viscous liquid flowing in said outlet passage, and (I) a plurality of fifth recesses in the sidewall surface of said stator, each of which fifth recesses terminates in a bottom surface angularly spaced from the inner sidewall surface of said rotor and communicates with and receives from an adjacent third recess (G) a viscous liquid which liquid is flowing in said third recess (G).

3. A two-stage pumping apparatus for delivering pressurized viscous molten glass to a fiberizing bushing, said molten glass containing bubbles which are undesirable for fiberizing, the first stage of said apparatus providing relatively high volume and low pressure delivery and permitting passage of bubbles, the second stage of said apparatus providing relatively lower volume and higher pressure than the first stage thereof and rejecting passage of bubbles, said second stage being connected to said fiberizing bushing, said apparatus comprising, a configured stator,
a smooth surfaced substantially cylindrical rotor,
means to rotate said rotor about said stator,
said stator having a first stage comprising:
a plurality of inlets disposed circumferentially about axis of said stator, each inlet being a bore aligned axially with said stator in communication with the circumferential peripheral of said stator and extending from an end of said stator less than the axial length of said stator;
a plurality of first cavities disposed circumferentially about said stator and each between two inlets and each adjacent pair separated by an inlet, each first cavity being an elongated cavity in communication with the circumferential periphery of said stator, aligned axially with said stator and extending less than the length of said stator, each end of each said first cavity being within the axial length of said stator and one end of each said first cavity being closer to the end of said stator from which adjacent inlets extend than the terminal end of such inlets along the axial length of said stator, each said first cavity having less cross-sectional area than each inlet in a plane perpendicular to the axis of said stator;
a plurality of arcuately-shaped surfaces separating said inlets and first cavities, which in combination with the cylindrical internal surface of said rotor from a plurality of restricted chambers separating said inlets and said cavities, each restricted chamber between an inlet and a first cavity ordered according to the direction of intended relative rotor-stator motion during pumping having a spacing between the stator surface and rotor surface greater than the spacing between the stator surface and rotor surface of each restricted chamber between a first cavity and an inlet ordered according to the direction of intended relative rotor-stator motion during pumping;
said inlets, first cavities and restricted chambers in combination with the rotor defining the first stage of said apparatus,
said stator having a second stage comprising:
a plurality of radial outlet passages;
central outlet bore in communication with said radial outlet passages disposed along the central axis of the stator and extending from the first stage end of the stator less than the length of the stator and in communication with the circumferential periphery of said stator through said radial outlet passages; a plurality of high pressure cavities in communication with said radial outlet passages disposed circumferentially about said stator, aligned axially with said stator and each between two first cavities of the first stage and each high pressure cavity having less cross-sectional area than each first cavity of the first stage in a plane perpendicular to the axis of said stator;
a plurality of arcuately-shaped surfaces separating said first cavities and high pressure cavities, which in combination with the cylindrical internal surface of said rotor form a plurality of restricted chambers separating said first cavities and high pressure cavities, each restricted chamber between a first cavity and a high pressure cavity ordered according to the direction of intended relative rotor-stator motion during pumping having a spacing between the stator surface and rotor surface greater than the spacing between the stator surface and rotor surface of each restricted chamber between a high pressure cavity and a first cavity ordered according to the direction of intended relative rotor-stator motion;

a bubble-containing glass outlet passage in communication with each of said first cavities;

said first cavities, high pressure cavities radial outlet passages, bubble-containing glass outlet passages, and restricted chambers in combination with the rotor defining the second stage of said apparatus.

4. A two-stage pumping apparatus as recited in claim 3 further including spaced liquid bearing means comprising wedge-shaped chambers disposed about the circumference of said stator for maintaining said relatively rotatable elements aligned with one another.

5. The apparatus of claim 4 wherein the surface of the wedge-shaped chambers form an angle with a tangent to the circumferential surface of the stator of less than 15°.

6. The apparatus of claim 3 wherein the stator has a complete circumferential surface at at least two locations along its axial length, said two locations being separated from one another by the midsection of the stator along its axial length.

7. The apparatus of claim 3 wherein the spacing between the rotor and stator of the restricted chambers of the first stage is greater than the spacing between the rotor and stator of the restricted chambers of the second stage so that the second stage is capable of pressurizing only a portion of the liquid entering it.

8. A fiber forming assembly comprising:
a glass melting tank;
a canal or forehearth extending from the glass melting tank to deliver molten glass therefrom;
the pumping apparatus according to claim 1 mounted in said canal or forehearth having its inlet passages (C) in communication with molten glass in said canal or forehearth;
distribution means connected to the outlet passage (A) of said pumping apparatus for receiving pressurized molten glass therefrom;
at least one orifice tube connected to said distribution means for receiving pressurized molten glass therefrom, said orifice tube having a plurality of holes therethrough for the passage of streams of glass therefrom; and
means to attenuate said streams of glass into fibers.

9. A fiber forming assembly as recited in claim 8 further including means for heating said distribution means to maintain said glass received therein in molten condition.

10. A fiber forming assembly as recited in claim 8 further including means for insulating said distribution means to reduce heat transfer therefrom.

11. A fiber forming assembly as recited in claim 8 in which said distribution member is a substantially horizontally disposed, elongated tubular assembly.

12. A fiber forming assembly as recited in claim 8 in which a plurality of spaced groups of orifice tubes are connected to said distribution member.

13. A fiber forming assembly as recited in claim 8 in which said distribution member is a substantially vertically disposed tubular member connected to said outlet of said pressurizing and pumping device.

14. A method for refining glass to provide bubble-free glass for working comprising:
delivering molten glass having bubbles therein from a molten glass feeder to a confined space between a pair of members relatively movable with respect to one another, said members having a centrally disposed longitudinal axis,
moving said members relative to one another to subject said molten glass in said confined space to shear so as to separate said molten glass into a first stream of bubble-free glass flowing in the direction of said centrally disposed axis from said confined space and a second stream of bubble-containing glass flowing in a laterally extending direction outwardly with respect to said centrally disposed axis from said confined space,
delivering said stream of bubble-free glass to a working area,
delivering said stream of bubble-containing glass to surface to flow in a thin layer flowing thereupon,
heating said thin layer of bubble-containing glass flowing over said surface to reduce the number of bubbles in said glass and until said glass flowing on said surface is substantially bubble-free, and
discharging the substantially bubble-free glass from said surface to said molten glass feeder.

15. The method of claim 14 wherein said surface for receiving the portion of bubble-containing glass is an inclined trough.

References Cited
UNITED STATES PATENTS

| | | | |
|---|---|---|---|
| 2,465,283 | 3/1949 | Schlehr | 65—2 X |
| 3,271,933 | 9/1966 | Harker et al. | 55—203 |
| 3,290,864 | 12/1966 | Harker | 55—203 |
| 3,446,149 | 5/1969 | Amos et al. | 65—11 R |
| 3,573,014 | 3/1971 | Strickland et al. | 65—1 |

ROBERT L. LINDSAY, Jr., Primary Examiner

U.S. Cl. X.R.

55—36, 171, 203; 65—11 R, 11 W, 136; 416—4